(12) United States Patent
Lim

(10) Patent No.: US 8,893,866 B2
(45) Date of Patent: Nov. 25, 2014

(54) SHOCK ABSORBING DEVICE FOR VEHICLE WITH MULTIPLE SHOCK ABSORBING STAGES

(75) Inventor: Ji-Ho Lim, Jeollanam-do (KR)

(73) Assignee: POSCO, Pohang-si (KR)

( * ) Notice: Subject to any disclaimer, the term of this patent is extended or adjusted under 35 U.S.C. 154(b) by 449 days.

(21) Appl. No.: 13/131,043

(22) PCT Filed: Feb. 17, 2009

(86) PCT No.: PCT/KR2009/000740
§ 371 (c)(1),
(2), (4) Date: May 25, 2011

(87) PCT Pub. No.: WO2010/062007
PCT Pub. Date: Jun. 3, 2010

(65) Prior Publication Data
US 2011/0233016 A1    Sep. 29, 2011

(30) Foreign Application Priority Data

Nov. 27, 2008   (KR) .......................... 10-2008-0119199

(51) Int. Cl.
| F16F 7/12 | (2006.01) |
| B60R 19/34 | (2006.01) |
| B61G 11/16 | (2006.01) |
| B60R 19/26 | (2006.01) |

(52) U.S. Cl.
CPC ............... *B60R 19/34* (2013.01); *B61G 11/16* (2013.01); *F16F 7/125* (2013.01); *B60R 2019/262* (2013.01)
USPC ...................................................... 188/377

(58) Field of Classification Search
USPC .......................... 188/371, 376–379
See application file for complete search history.

(56) References Cited

U.S. PATENT DOCUMENTS

| 7,357,445 B2* | 4/2008 | Gross et al. .............. 296/187.09 |
| 2007/0034468 A1 | 2/2007 | Kemper |
| 2007/0251782 A1 | 11/2007 | Chen et al. |

FOREIGN PATENT DOCUMENTS

| DE | 102010029054 A1 | 11/2011 |
| JP | 49000672 | 1/1974 |
| JP | 4958036 A | 5/1974 |
| JP | 5026535 A | 3/1975 |
| JP | 52008571 | 3/1977 |
| JP | 54040436 | 3/1979 |
| JP | 62156064 A | 10/1987 |
| JP | 2001241478 A | 9/2001 |
| JP | 2004025921 A | 1/2004 |
| KR | 20070022644 A | 2/2007 |
| KR | 100826471 B1 | 4/2008 |

\* cited by examiner

*Primary Examiner* — Melanie Torres Williams
(74) *Attorney, Agent, or Firm* — The Webb Law Firm

(57) ABSTRACT

There is provided a collision energy absorbing apparatus, in particular, a collision energy absorbing apparatus for use in a vehicle, having a plurality of absorption phases, including: a first deformation part undergoing a first plastic deformation due to expansion so as to absorb collision energy generated in the event of a vehicle accident; a second transformation part disposed in line with an end of the first deformation part, the second transformation part undergoing a second plastic deformation after the first plastic deformation of the first deformation part so as to sequentially absorb collision energy in the event of a vehicle accident; and an expansion inducing part combined with an end of the second deformation part and disposed between the first deformation part and the second deformation part to guide the first plastic deformation of the first deformation part.

5 Claims, 4 Drawing Sheets

Prior Art

SHOCK ABSORBING DEVICE FOR VEHICLE WITH MULTIPLE SHOCK ABSORBING STAGES

TECHNICAL FIELD

The present invention relates to a collision energy absorbing apparatus for use in a vehicle for protecting passengers from a collision force in the event of a crash or accident.

BACKGROUND ART

In general, a vehicle is equipped with a collision energy absorbing apparatus for absorbing shock force to protect passengers in the event of a car accident, for example, a crash.

In a vehicle such as a car, a train, or the like, moving at a high speed, a vehicle accident may occur due to a collision with another vehicle or a fixed structure. In this case, energy generated in the event of a vehicle accident needs to be effectively absorbed in order to secure passenger safety.

A method of absorbing collision energy according to the related art utilizes plastic energy generated when a collision structure member is deformed in the event of an accident. For example, a collision energy absorbing apparatus 10 may include a support part 10a provided with a fixture 1 and a plastic deformation part 10b provided in line with the support part 10a as shown in FIG. 1. In this configuration, as shown in FIG. 2, energy transferred from the colliding body 20 is converted into plastic energy generated as the plastic deformation part 10b is crushed, such that collision energy may be absorbed.

As such, since in the crush method used to absorb collision energy, all regions in structural members absorb collision energy, lightness thereof may be obtained.

However, since bending deformation may occur in a material and thus sufficient plastic deformation may not be provided therein, the energy absorption capability per unit mass of a member may be relatively low. Therefore, many attempts at increasing collision energy absorption capabilities through designing structural members having various shapes, for example, hexagonally-shaped collision structural members or the like, by adding a structure such as a foam member, a lattice rib, or the like, between structural materials, have been undertaken.

Meanwhile, in a case in which a length of a space available to absorb collision energy, based on vehicles type or structure, is relatively short, higher collision energy absorption capability per unit length is required.

For example, since, in a case of a train, a deformation space of a collision structural member at the time of a collision is relatively small, the maximum possible energy absorption capabilities of a material may be utilized by using a tube-expanding type collision energy absorbing apparatus. However, in this method, since a portion thereof, provided to expand a tube is a rigid body and so is not deformed, the weight of the apparatus may be heavy. This is the current situation with regard to difficulties in configuring an apparatus for wholly absorbing collision energy by using only plastic deformation utilizing tube-expansion.

As another example, unlike in the above-described case, an electrical car, a fuel-cell powered vehicle or the like, currently in development, may be relatively heavy and have relatively small amount of collision energy absorption space, therefore high collision energy absorption capability per unit length is required.

In this case, since the collision energy absorption method using the existing crush method has a small amount of plastic deformation from bending deformation, it is inappropriate to sufficiently utilize the high energy absorption capabilities of a high-elongation material and thus, a relatively large crush space is required.

In the case of a general collision, plastic deformation occurs through the bending deformation of a plate, and thus, a mean deformation rate may be approximately 20%. The surface of a plate excepting a center may undergo a large amount of deformation, while a central surface thereof may largely lack deformation. Thus, plastic deformation may be generated intensively only on a folded portion of the plate. Therefore, in terms of an overall collision member, the amount of plastic deformation may not be sufficient for the characteristics of a highly-elongated material.

Accordingly, the development of a collision energy absorption apparatus capable of absorbing a large amount of collision energy per unit length is necessary.

SUMMARY OF THE INVENTION

An aspect of the present invention provides a collision energy absorbing apparatus for use in a vehicle, having a plurality of absorption phases. The collision energy absorbing apparatus according to an aspect of the present invention may be provided to increase collision energy absorption performance per unit length by using high strength and high elongation material characteristics. In the collision energy absorbing apparatus according to an aspect of the present invention, collision energy may be effectively absorbed even in the case that the length of a space required to absorb collision energy is relatively short, collision energy generated at the time of a vehicle crash may be absorbed in phases, and relatively high amount of collision energy may also be absorbed, and thus, the production of a light-weight vehicle may be possible. In addition, absorption of collision energy appropriate to respective low speed and high speed collisions may be applied, and a collision acceleration may be significantly reduced such that passenger injuries may be reduced. Further, a collision crush space may be reduced so as to decrease limitations in the design of a vehicle.

The collision energy absorbing apparatus for use in a vehicle, having a plurality of absorption phases, according to an aspect of the present invention, may be configured to absorb in phases collision energy generated in the event of vehicle crash.

According to an aspect of the present invention, there is provided a collision energy absorbing apparatus for use in a vehicle, having a plurality of absorption phases, the apparatus including: a first deformation part having a tube shape and undergoing a first plastic deformation due to expansion so as to absorb collision energy generated in the event of a vehicle accident; a second transformation part formed to have a tube shape and disposed in line with an end of the first deformation part, the second transformation part undergoing a second plastic deformation after the first plastic deformation of the first deformation part so as to sequentially absorb collision energy in the event of a vehicle accident; and an expansion inducing part combined with an end of the second deformation part and disposed between the first deformation part and the second deformation part to guide the first plastic deformation of the first deformation part.

The first deformation part may be provided with a preliminary expansion part formed at a portion thereof contacting the expansion inducing part so as to be expanded by the expansion inducing part and undergo plastic deformation in the event of a vehicle accident.

The first deformation part may be formed of a material having a lower rigidity than that of the second deformation part or formed to be thinner than that of the second deformation part so as to have a structure reduced in thickness.

The first deformation part may be formed to have a length equal to that of the second deformation part to undergo plastic deformation through crushing together with the second deformation part in the second plastic deformation after the first plastic deformation.

The first deformation part may be formed to have a length shorter than that of the second deformation part such that the first and second deformation parts together undergo a third plastic deformation through crushing after the second deformation part undergoes the second plastic deformation through crushing in a portion of the second deformation part after the first plastic deformation of the first deformation part.

The first deformation part may be formed to have a length longer than that of the second deformation part such that the first and second deformation parts together undergo the third plastic deformation through crushing after the first deformation part undergoes the second plastic deformation through crushing in a portion of the first deformation part after the first plastic deformation of the first deformation part.

The expansion inducing part may have a sloped face formed in a movement direction of the first deformation part to allow for an easy expansion of the first deformation part in the event of a vehicle accident.

As set forth above, according to an embodiment of the present invention, a collision energy absorbing apparatus for use in a vehicle, having a plurality of absorption phases, is provided to increase collision energy absorption performance per unit length by using high strength and high elongation material characteristics.

In the collision energy absorbing apparatus according to an aspect of the present invention, collision energy may be effectively absorbed even when a space length required to absorb collision energy is relatively short.

In addition, since absorption energy per unit length is high, the apparatus may be applied to vehicles having a short crash collapse distance such as in next-generation vehicles or the like.

Collision energy generated at the time of a vehicle crash may be absorbed in phases to significantly reduce collision acceleration, thereby decreasing passenger injuries.

Further, according to an aspect of the present invention, relatively high collision energy may be absorbed, and simultaneously, the weight of a collision member may be decreased, thereby allowing for the production of a lightweight vehicle.

In addition, the absorption of collision energy appropriate to respective low and high speed collisions may be applied.

Furthermore, a collision crush space may be reduced so as to decrease limitations in the design of a vehicle.

Moreover, according to an aspect of the present invention, the possibility of the application of the present invention to a hydro-formed frame type car-body may be provided in order to utilize collision energy absorption capabilities not only in an expansion tube, but also in a fixed tube.

BRIEF DESCRIPTION OF THE DRAWINGS

The above and other aspects, features and other advantages of the present invention will be more clearly understood from the following detailed description taken in conjunction with the accompanying drawings, in which:

FIGS. 9 and 10 are cross-sectional views of a collision energy absorbing apparatus having a plurality of absorption phases showing a deformed state in the event of a vehicle accident according to another embodiment of the present invention.

DETAILED DESCRIPTION OF THE INVENTION

Figure 1:
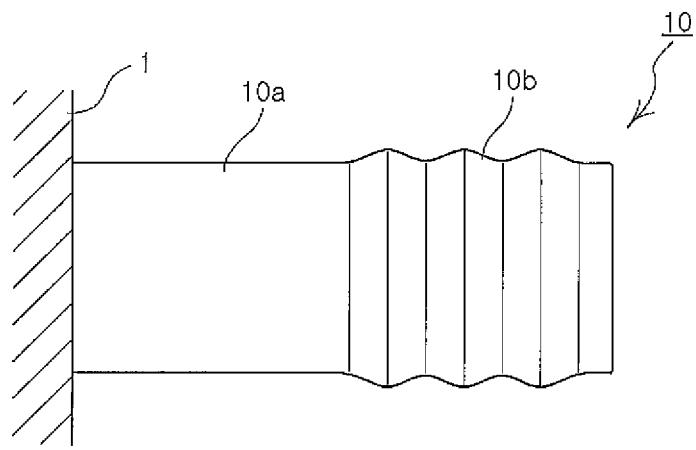
FIG. 1 is a schematic structure view of a collision energy absorbing apparatus for use in a vehicle according to the related art.
Figure 2:
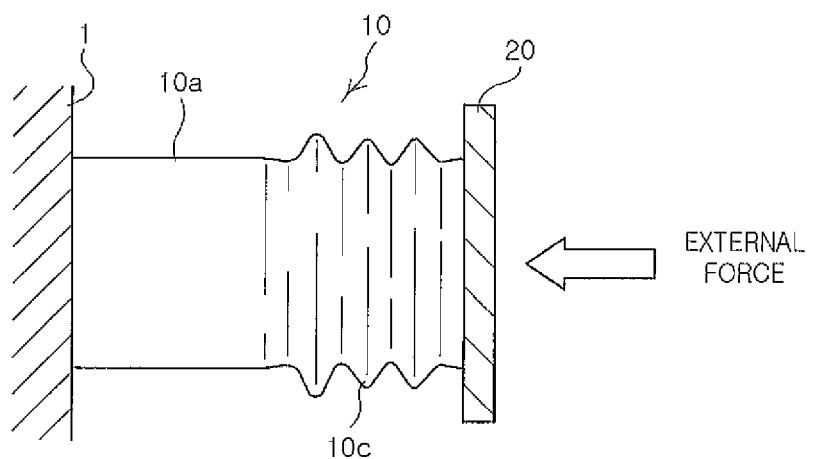
FIG. 2 is a schematic structure view showing a deformed state of the collision energy absorbing apparatus of FIG. 1.

Embodiments of the present invention will now be described in detail with reference to the accompanying drawings such that they could be easily practiced by those having skill in the art to which the present invention pertains. However, in describing the embodiments of the present invention, detailed descriptions of well-known functions or constructions will be omitted so as not to obscure the description of the present invention with unnecessary detail.

In addition, like reference numerals denote like elements throughout the drawings.

Unless explicitly described to the contrary, the word "comprise" and variations such as "comprises" or "comprising," will be understood to imply the inclusion of stated elements but not the exclusion of other elements.

According to embodiments of the present invention, a collision energy absorbing apparatus for use in a vehicle having a plurality of absorption phases will be described in detail below.

Embodiments of the present invention described below will be based on the configuration in which collision energy generated in a vehicle accident is absorbed in phases.

Figure 3:
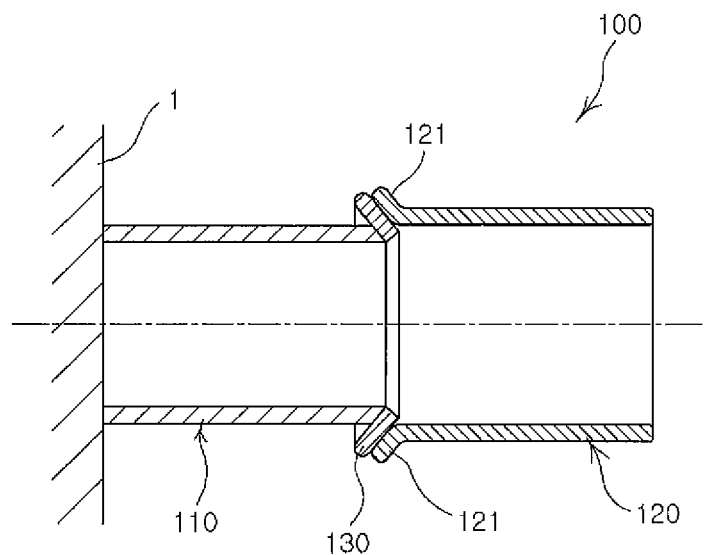
FIG. 3 is a schematic cross-sectional view of a collision energy absorbing apparatus for use in a vehicle having a plurality of absorption phases according to an embodiment of the present invention.

Referring to FIG. 3, according to an embodiment of the present invention, a collision energy absorbing apparatus 100 may be configured to include a first deformation part 120 and a second deformation part 110 which are disposed in line with each other so as to absorb in phases collision energy generated in a vehicle accident or the like.

The first deformation part 120 may be configured to undergo first plastic deformation prior to that of the second deformation part 110 in the event of a vehicle accident. The plastic deformation in the first deformation part 120 may be generated in the manner of the expansion of a tube, and in this case, the first deformation part 120 may be formed to have a tube shape. This tube shaped first deformation part 120 may include openings formed at both ends thereof or a single opening formed at an end thereof, of which a sectional structure may be provided without limiting a shape thereof.

Collision energy generated in a vehicle accident may be absorbed by the plastic deformation of the first deformation part 120.

The second deformation part 110 may be combined with a fixture body 1 disposed in a vehicle, that is, one end of the second deformation part 110 may be fixed to the fixture body 1 and the other end thereof may be coupled to the first deformation part 120, such that the first deformation part 120 is disposed in line with the other end of the second deformation part 110. The second deformation part 110 may be configured so as not to be deformed or so as to have significantly reduced deformation when the first deformation part 120 undergoes plastic deformation, such that the first deformation part 120 may undergo plastic deformation in the manner of expansion.

Meanwhile, the second deformation part 110 may be configured to undergo second plastic deformation after the first deformation part 120 is plastically deformed. That is, the second deformation part 110 may be maintained in an original state thereof for as long as possible while the first deformation part 120 is undergoing plastic deformation in the form of expansion, and the second plastic deformation part 110 may be plastically deformed after the plastic deformation of the first deformation part 120.

For example, the second deformation part 110 may undergo plastic deformation in the form of crushing together with the first deformation part 120 after the first deformation part 120 undergoes expansion plastic deformation.

Further, the second deformation part 110 may be configured to include an expansion inducing part 130 formed at a single end thereof. The expansion inducing part 130 may be combined with an end of the second deformation part 110 to be disposed between the second deformation part 110 and the first deformation part 120.

In this case, the first deformation part 120 may be combined with the expansion inducing part 130 in the manner in which a single end of the first deformation part 120 is temporarily fixed to the expansion inducing part 130. For example, the first deformation part 120 may be combined with the expansion inducing part 130 such that breakage at a combined portion therebetween may occur prior to the generation of the plastic deformation of the first deformation part 120 in the occurrence of a crash.

In addition, the expansion inducing part 130 may be configured so as not to be deformed or so as to have significantly reduced deformation when the first deformation part 120 is plastically deformed. In other words, the expansion inducing part 130 may be formed to have relatively more allowable stress rigidity than that of the first deformation part 120. In this case, the expansion inducing part 130 may be formed of a material having higher rigidity than that of the first deformation part 120 or formed to be thicker than that of the first deformation part 120 so as to have sufficient rigidity.

Meanwhile, the first deformation part 120 may be configured to include a preliminary expansion part 121 formed at an end of the first deformation part 120 contacting the expansion inducing part 130. The preliminary expansion part 121 may act such that expansion is sequentially undertaken from an end region of the first deformation part 120 contacting the expansion inducing part 130 in the event of a vehicle accident. For this expansion scheme, the first deformation part 120 may be disposed outside the second deformation part 110, that is, in the manner in which the second deformation part 110 is disposed at an inner portion of the first deformation part 120.

In this state, in a case in which collision energy is not sufficiently absorbed through the plastic deformation of the first deformation part 120, that is, when residual collision energy exists, the second deformation part 110 and the first deformation part 120 may be plastically deformed together. At this time, the plastic deformation may be generated through crushing.

In the configuration described above, a collision load may be gradually increased to reduce collision acceleration applied to passengers, thereby reducing the extent of body injuries to passengers. In addition, the first deformation part 120 is first plastically deformed to first absorb a relatively small amount of collision energy, and then, the second deformation part 110 and the first deformation part 120 are plastically deformed together to absorb a relatively large amount of collision energy. Accordingly, the configuration according to the embodiment of the present invention may be appropriate to low speed and high speed collisions to allow for an increase of absorption energy per unit length.

For example, when the first deformation part 120 is plastically deformed by a collision, a sloped face in the expansion inducing part 130 may be formed in a movement direction of the first deformation part 120 moving due to the collision such that the expansion of the expansion inducing part 130 may be easily guided. In this case, an expansion ratio of the first deformation part 120 and a plastic strain ratio of a crush form of the first deformation part 120 provided after the expansion may be decided according to formation angle and length of the expansion inducing part 130.

As described above, the second deformation part 110 may be configured to have relatively more allowable stress rigidity than that of the first deformation part 120 so as not to generate plastic deformation while the first deformation part 120 is plastically expanded. In order to increase the allowable stress rigidity of the second deformation part 110, the second deformation part 110 may be formed of a material having a higher rigidity than that of the first deformation part 120 or formed to be thicker than that of the first deformation part 120, or the second deformation part 110 may be formed to be stronger and also thicker than the first deformation part 120.

In the first deformation part 120 there may be generated not only plastic deformation due to expansion but plastic deformation due to the bending and stretching by the expansion inducing part 130. Therefore, in order to decide on a plastic deformation amount of the first deformation part 120 at the time of expansion, a bending deformation amount based on an angle of the sloped face formed in the expansion inducing part 130 may be considered together with an expansion ratio of the first deformation part 120. That is, the expansion ratio and the bending deformation amount may be considered such that a residual absorption ratio excepting an absorption ratio required in the second plastic deformation may be significantly increased.

By the configuration described above, the collision energy absorbing apparatus 100 may be applied with respect to varying collision energy in which plastic deformation due to a primary expansion and plastic deformation due to secondary crushing may be sequentially generated.

Figure 4:
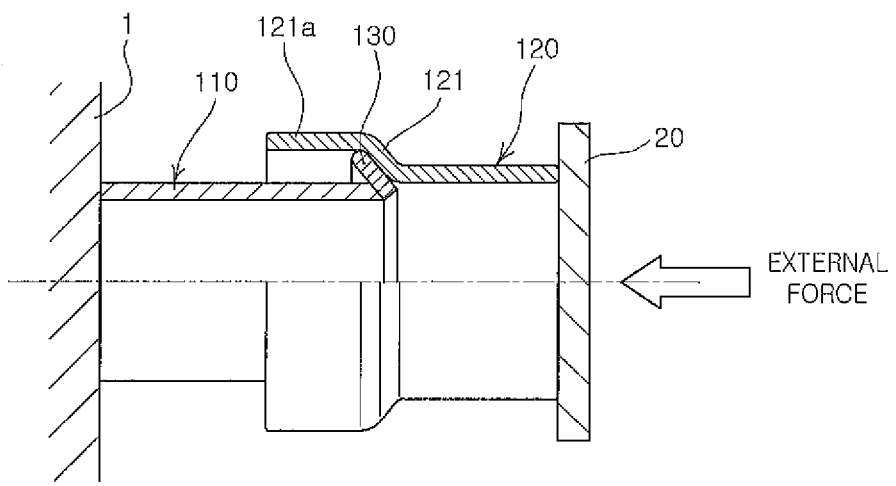
FIGS. 4 to 6 are cross-sectional views showing phased deformation of a collision energy absorbing apparatus for use in a vehicle having a plurality of absorption phases in the event of a vehicle accident according to an embodiment of the present invention.

When the collision energy absorbing apparatus 100 configured as described above undergoes a collision generated by a colliding body 20, the first deformation part 120 may undergo expansion by the expansion inducing part 130 as shown in FIG. 4. In this case, a contact region of the first deformation part 120 contacting the expansion inducing part 130 may be sequentially bent and stretched along a length direction thereof.

Figure 5:
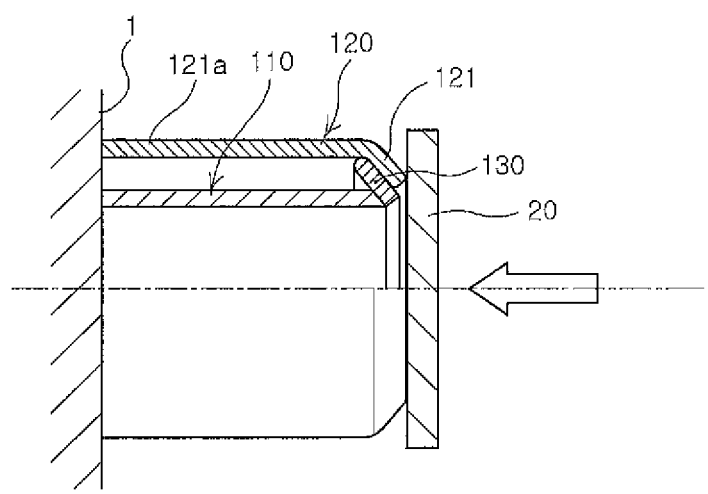

For example, when collision energy is not completely absorbed through a partial expansion on an expansion region 121*a* provided as a portion of the plastically-deformed first deformation part 120, the first deformation part 120 may undergo plastic deformation through the expansion until a single end of the first deformation part 120 is in contact with the fixture body 1 as shown in FIG. 5, so as to absorb collision energy.

Figure 6:
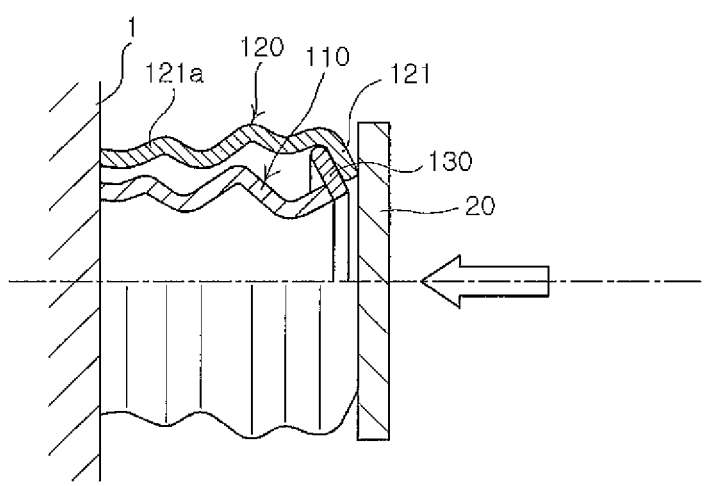

When collision energy is not completely absorbed by the plastic deformation of the first deformation part 120 as described above, the first deformation part 120 may undergo plastic deformation in the form of crushing together with the second deformation part 110 to absorb the collision energy as shown in FIG. 6.

By the process described above, collision energy may be absorbed by the plastic deformation of the first deformation part 120 in a case of a low speed collision, while the second deformation part 110 is not deformed. Therefore, when parts are required to be repaired, only the first deformation part 120 or only the first deformation part 120 and the expansion inducing part 130 may be simply replaced. In a case of a high speed collision, primary collision energy may be absorbed by the plastic deformation of the first deformation part 120 and the collision energy may then be doubly absorbed together with the second deformation part 110, thereby obtaining relatively high collision energy rather than that obtained in a general crushing method. In addition, since the first deformation part 120 may provide a relatively significantly-increased plastic deformation ratio through crushing after expansion, a relatively high energy-absorption capability in a high elongation and high rigidity material may be realized.

Figure 7:
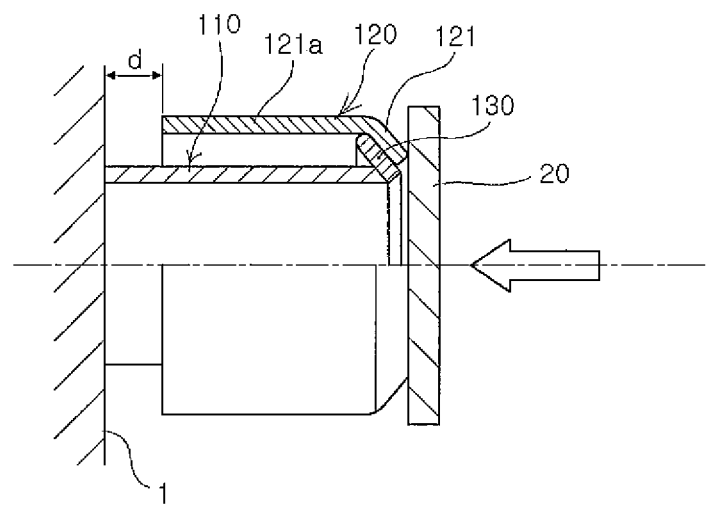
FIGS. 7 and 8 are cross-sectional views of a collision energy absorbing apparatus having a plurality of absorption phases showing a deformed state in the event of a vehicle accident according to another embodiment of the present invention.

According to another embodiment of the present invention, a first deformation part 120 may be formed to have a length shorter or longer than that of the second deformation part 110, as shown in FIGS. 7 and 9, respectively. As shown in FIG. 7, a single end of the first deformation part 120 is not in contact with the fixture body 1 and may be spaced apart therefrom at a predetermined interval (d) in a state in which the first plastic deformation is completed.

At this time, the first deformation part 120 may only undergo plastic deformation generated due to the expansion at an initial collision as described above referring to FIGS. 4 and 5.

Figure 8:
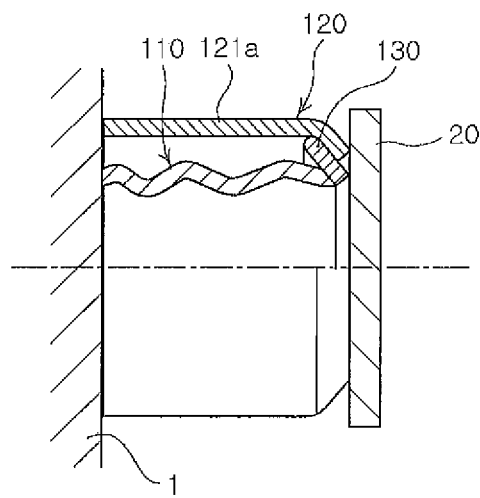

After the first deformation part 120 has undergone plastic deformation by the expansion, the second deformation part 110 alone may absorb a predetermined magnitude of collision energy while generating plastic deformation through crushing, prior to that in the first deformation part 120, as shown in FIG. 8.

Residual collision energy may be absorbed through plastic deformation in the form of crushing in the first and second deformation parts 120 and 110 together as described above referring to FIG. 6.

In this case, it can be appreciated that collision energy is absorbed through three phases.

As set forth above, according to an embodiment of the present invention, a collision energy absorbing apparatus for use in a vehicle, having a plurality of absorption phases, is provided to increase collision energy absorption performance per unit length by using high strength and high elongation material characteristics.

While the present invention has been shown and described in connection with the embodiments in the collision energy absorbing apparatus for use in a vehicle, having a plurality of absorption phases, it will be apparent to those skilled in the art that modifications and variations can be made without departing from the spirit and scope of the invention as defined by the appended claims.

The invention claimed is:

1. A collision energy absorbing apparatus for use in a vehicle, having a plurality of absorption phases, the apparatus comprising:
    a first deformation part having a tube shape;
    a second transformation part formed to have a tube shape and disposed in line with an end of the first deformation part; and
    an expansion inducing part combined with an end of the second deformation part and disposed between the first deformation part and the second deformation part,
    the first deformation part undergoing a first plastic deformation due to expansion so as to absorb collision energy generated in the event of a vehicle accident and then undergoing a second plastic deformation through crushing, the second transformation part undergoing the plastic deformation through the crushing after the first plastic deformation of the first deformation part so as to sequentially absorb collision energy in the event of the vehicle accident, and the expansion inducing part being configured to guide the first plastic deformation of the first deformation part in the event of the vehicle accident,
    wherein the first deformation part is formed to have a length longer than that of the second deformation part such that the first and second deformation parts together undergo the third plastic deformation through crushing after the first deformation part undergoes the second plastic deformation through crushing in a portion of the first deformation part after the first plastic deformation of the first deformation part.

2. The apparatus of claim 1, wherein the first deformation part is provided with a preliminary expansion part formed at a portion thereof contacting the expansion inducing part so as to be expanded by the expansion inducing part and undergo plastic deformation in the event of a vehicle accident.

3. The apparatus of claim 1, wherein the first deformation part is formed of a material having a lower rigidity than that of the second deformation part or formed to be thinner than that of the second deformation part so as to have a structure reduced in thickness.

4. The apparatus of claim 1, wherein the expansion inducing part has a sloped face formed in a movement direction of the first deformation part to allow for an easy expansion of the first deformation part in the event of a vehicle accident.

5. A collision energy absorbing apparatus for use in a vehicle, having a plurality of absorption phases, the apparatus comprising:
    a first deformation part having a tube shape;
    a second transformation part formed to have a tube shape and disposed in line with an end of the first deformation part; and
    an expansion inducing part combined with an end of the second deformation part and disposed between the first deformation part and the second deformation part,
    the first deformation part undergoing a first plastic deformation due to expansion so as to absorb collision energy generated in the event of a vehicle accident and then undergoing a plastic deformation through crushing, the second transformation part undergoing a second plastic deformation through crushing after the first plastic deformation of the first deformation part so as to sequentially absorb collision energy in the event of the vehicle accident, and the expansion inducing part being configured to guide the first plastic deformation of the first deformation part in the event of the vehicle accident,
    wherein the first deformation part is formed to have a length shorter than that of the second deformation part such that the first and second deformation parts together undergo a third plastic deformation through crushing after the second deformation part undergoes the second plastic deformation through crushing in a portion of the second deformation part after the first plastic deformation of the first deformation part.

* * * * *